(12) United States Patent
Klode

(10) Patent No.: US 9,463,872 B2
(45) Date of Patent: Oct. 11, 2016

(54) BI-STABLE CLUTCH WITH PERMANENT MAGNET ARRAY

(71) Applicant: GOODRICH CORPORATION, Charlotte, NC (US)

(72) Inventor: Harald Klode, Centerville, OH (US)

(73) Assignee: GOODRICH CORPORATION, Charlotte, NC (US)

(*) Notice: Subject to any disclaimer, the term of this patent is extended or adjusted under 35 U.S.C. 154(b) by 0 days.

(21) Appl. No.: 14/592,635

(22) Filed: Jan. 8, 2015

(65) Prior Publication Data

US 2016/0200427 A1 Jul. 14, 2016

(51) Int. Cl.
| | |
|---|---|
| B60L 7/24 | (2006.01) |
| B60L 7/28 | (2006.01) |
| B64C 25/44 | (2006.01) |
| B60T 1/06 | (2006.01) |
| B60T 13/74 | (2006.01) |

(52) U.S. Cl.
CPC ............... *B64C 25/44* (2013.01); *B60T 1/06* (2013.01); *B60T 13/748* (2013.01)

(58) Field of Classification Search
CPC ........... F16D 2121/20; F16D 2121/22; F16D 2121/26; F16D 55/00; F16D 55/28; F16D 59/02; F16D 51/00; F16D 2055/0058; F16D 49/02; F16D 27/105; H02K 7/1025; H02K 2207/03; H01F 7/1646; H01F 7/122; H01F 7/127; H01F 7/1615; H01F 2007/1669; Y10T 29/49075; Y10T 29/49105; B60T 1/062; E06B 9/72
USPC ................ 188/161, 167.2, 171, 173, 267.2
See application file for complete search history.

(56) References Cited

U.S. PATENT DOCUMENTS

| | | | | |
|---|---|---|---|---|
| 3,966,024 A | * | 6/1976 | Baer | F16D 67/02 188/71.2 |
| 4,306,206 A | * | 12/1981 | Myers | H01F 7/1615 335/229 |
| 5,099,974 A | * | 3/1992 | Spechko | F16D 27/105 192/35 |
| 5,133,437 A | * | 7/1992 | Larson | F16D 27/105 192/12 BA |
| 5,687,822 A | * | 11/1997 | Arai | F16D 27/105 192/81 C |
| 6,138,808 A | * | 10/2000 | Wussow | F16D 27/105 192/48.2 |
| 6,247,569 B1 | * | 6/2001 | McGuire | F16D 27/025 192/35 |
| 2009/0251021 A1 | * | 10/2009 | Atarashi | H02K 1/2793 310/156.07 |
| 2009/0272615 A1 | * | 11/2009 | Buzzard | F16D 27/105 192/84.81 |

FOREIGN PATENT DOCUMENTS

| | | |
|---|---|---|
| DE | 102013203401 | 8/2014 |
| EP | 160215 A1 * | 11/1985 |
| GB | 1505440 | 3/1978 |

OTHER PUBLICATIONS

Extended European Search Report dated May 19, 2016 in European Application No. 16150241.4.

\* cited by examiner

*Primary Examiner* — Robert A Siconolfi
*Assistant Examiner* — San Aung
(74) *Attorney, Agent, or Firm* — Snell & Wilmer L.L.P.

(57) ABSTRACT

A park brake actuator ("PBA") may comprise a shaft having a friction hub disposed about the shaft, the friction hub fixed against rotation with respect to the shaft, a permanent magnet array (PMA) disposed circumferentially about the shaft, the PMA comprising a cylindrical structure comprising a Type A magnet adjacent a Type B magnet in an annular arrangement, and a coil disposed circumferentially about the PMA and configured to conduct at least one of a positive current pulse and a negative current pulse.

15 Claims, 4 Drawing Sheets

BI-STABLE CLUTCH WITH PERMANENT MAGNET ARRAY

FIELD

The present disclosure relates to aircraft brake systems, and more particularly, to aircraft park brake systems.

BACKGROUND

An aircraft brake system may include a park brake. The park brake may prevent the wheels of the aircraft from rotating. Existing park brakes may include a friction disk which is clamped via a spring between the brake housing and a steel armature plate.

SUMMARY

In various embodiments, a park brake actuator ("PBA") is disclosed comprising a shaft having a friction hub disposed about the shaft, the friction hub fixed against rotation with respect to the shaft, a permanent magnet array (PMA) disposed circumferentially about the shaft, the PMA comprising a cylindrical structure comprising a Type A magnet adjacent a Type B magnet in an annular arrangement, and a coil disposed circumferentially about the PMA and configured to conduct at least one of a positive current pulse and a negative current pulse.

In various embodiments, a PBA is disclosed comprising, a shaft having a friction hub disposed about the shaft, the friction hub fixed against rotation with respect to the shaft, a permanent magnet array (PMA) disposed circumferentially about the shaft, the PMA comprising a cylindrical structure comprising an annular arrangement of Type A magnets disposed concentrically with an annular arrangement of Type B magnets, and a coil disposed circumferentially about the PMA and configured to conduct at least one of a positive current pulse and a negative current pulse.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show various embodiments by way of illustration. While these various embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In various embodiments, an aircraft brake system may comprise a brake system controller ("BSC") coupled to one or more electro-mechanical actuator controllers ("EMACs"), which may drive an electro-mechanical actuator ("EMA"). The BSC may be in communication with a brake pedal, and thus may control the EMACs in accordance with pilot/copilot braking commands. For example, brake pedal deflection may be indicative of pilot/copilot braking commands. The EMA may be coupled to or otherwise operate a pressure generating device, such as, for example, a ball screw, a ram, and/or the like. In operation, the EMA may cause the pressure generating device to move and/or exert a force on other brake system structures, such as a brake disk or pad to exert a force that restrains rotation of a wheel or other suitable moving structure. This stopping force may load and/or exert a corresponding force on the EMA structures such as, for example, an EMA housing. The EMA may comprise a motor shaft that is configured to rotate. An EMA may also comprise a PBA to selectively lock and unlock, as described herein, the motor shaft.

Figure 1:
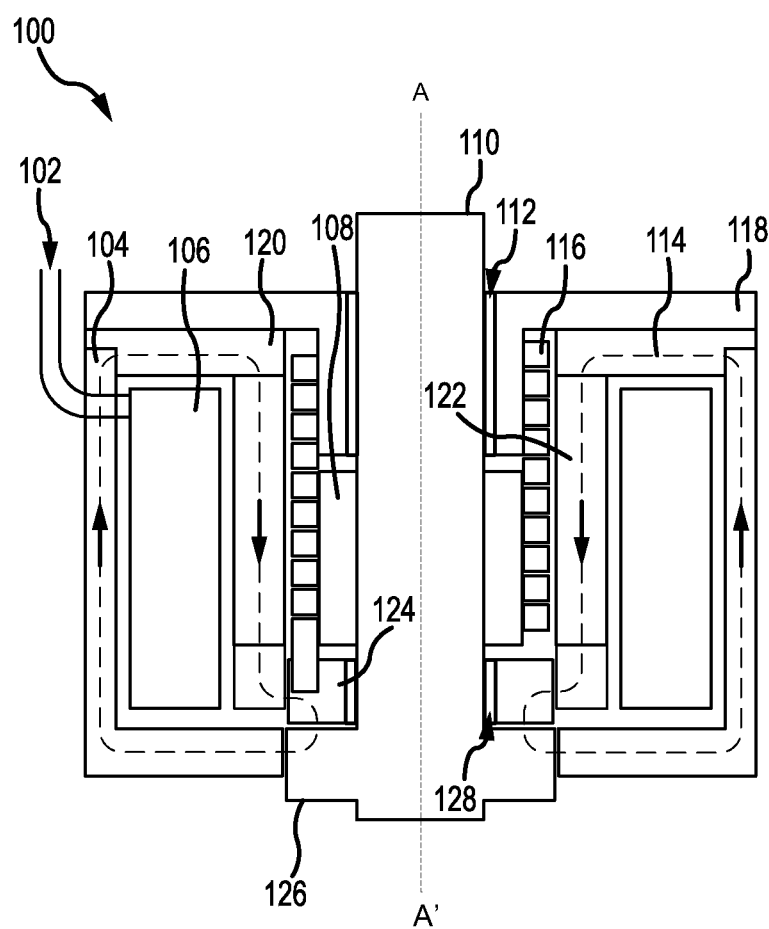
FIG. 1 illustrates a cross sectional view of a PBA that may be part of an electro-mechanical actuator ("EMA"), in accordance with various embodiments.

Referring to FIG. 1, a section view of a portion of an EMA that illustrates PBA 100 is shown according to various embodiments. The PBA may extend along the axis marked A-A', with A being located near a distal portion of PBA 100 and A' being near a proximal portion of PBA 100. The PBA 100 may, as described above, be involved in the application of a braking force to an aircraft wheel.

Generally, a motor drive unit may drive shaft 110 through a plurality of rotations. PBA 100 includes a bi-stable park brake. In that regard, a "bi-stable park brake" may refer to a park brake feature that is able to be stable (i.e., not consume outside electrical energy) in two different states. Typically, a "bi-stable park brake" has a "locked" state and an "unlocked" state. The "locked" state may refer to a state wherein shaft 110 is constrained from rotational motion. The "unlocked" state may refer to a state wherein shaft 110 is free to rotate. In that regard, in both the "locked" state and the "unlocked" state, PBA 100 may not draw external electrical energy to maintain itself in either state. However, external electrical energy may be applied to PBA 100 to toggle between the "locked" state and the "unlocked" state. Prevention of rotation of shaft 110 may be advantageous in a parking brake mode. A bi-stable brake may thus be switched from one state to another. After reaching either state, as discussed above, the state may be maintained without any additional energy input.

With continuing reference to FIG. 1, a cross sectional view of an PBA 100 is illustrated according to various embodiments. Shaft 110 may rotate a ball screw to transform the rotary motion of the ball screw into linear motion of a ball nut. A friction hub 108 may be coupled to the shaft 110. The friction hub 108 may be disposed about the circumference of shaft 110 such that friction hub 108 is fixed relative to shaft 110. Stated another way, rotation of shaft 110 results in rotation of friction hub 108.

The PBA 100 may comprise a wrap spring 116. Wrap spring 116 is disposed circumferentially about (and, in various embodiments, coaxial to or substantially coaxial to) shaft 110. Wrap spring 116 is disposed circumferentially about (and, in various embodiments, coaxial to or substantially coaxial to) friction hub 108 and may be in contact with friction hub 108. Wrap spring 116 may comprise any suitable material, including stainless steel. Wrap spring 116 may have any suitable spring constant. Wrap spring 116 is fixed to top plate 118. Top plate 118 is fixed against rotation relative to shaft 110. Top plate 118 is comprised of a non-magnetic material. Bearing sleeve 112 is disposed circumferentially about (and, in various embodiments, coaxial to or substantially coaxial to) shaft 110 and is proximate top plate 118. Bearing sleeve 128 is disposed circumferentially about (and, in various embodiments, coaxial to or substantially coaxial to) shaft 110 and is proximate shaft collar 126.

Wrap spring 116 is fixed to control ring 124. Control ring 124 is disposed circumferentially about (and, in various embodiments, coaxial to or substantially coaxial to) shaft 110. Control ring 124 is free to rotate about shaft 110. In that regard, rotation of control ring 124 about shaft 110 may tighten wrap spring 116 or relax wrap spring 116. Stated another way, wrap spring 116 may become more tightly coiled in response to control ring 124 rotating about shaft 110 in a first direction (e.g., clockwise) and wrap spring 116 may become less tightly coiled in response to control ring 124 rotating about shaft 110 in a second direction (e.g., counter-clockwise). In response to wrap spring 116 becoming more tightly coiled, wrap spring 116 may exert a compressive force upon shaft 110. Stated another way, wrap spring 116 may exert a force that is radially inward with respect to axis A-A'. The compressive force of wrap spring 116 may constrain friction hub 108 from rotational motion. Constraining friction hub 108 from rotational motion in turn constrains shaft 110 from rotational motion.

Leads 102 may electrically couple a power source to coil 106. Leads 102 may supply AC electrical energy and/or DC electrical energy. Leads may comprise any material suitable for conducting electricity. For example, leads 102 may comprise a wire such as a copper wire. Inner flux guide 120 may comprise any material suitable for guiding a magnetic flux. Inner flux guide 120 may be disposed to traverse a radial distance with respect to axis A-A'. Inner flux guide 120 may radially overlap permanent magnet array (PMA) 122. In that regard, PMA 122 and inner flux guide 120 may occupy an area that is the same radial distance from axis A-A' but that is spaced axially apart with respect to axis A-A'.

Figure 2A:
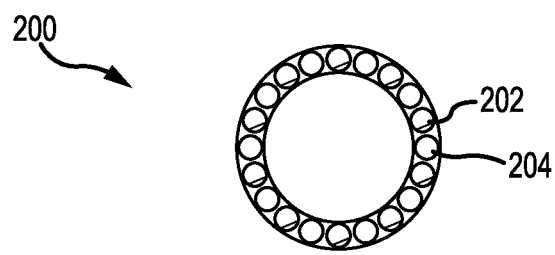
FIGS. 2A, 2B, and 2C illustrate a permanent magnet array of the PBA of FIG. 1, in accordance with various embodiments.
Figure 2B:
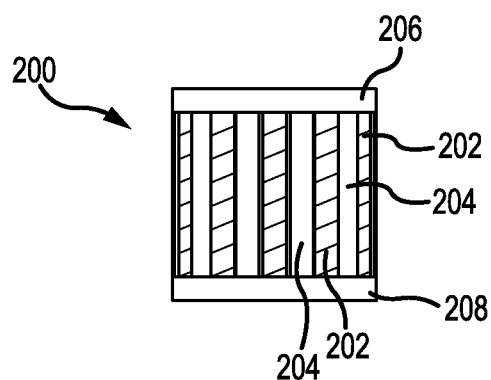
Figure 2C:
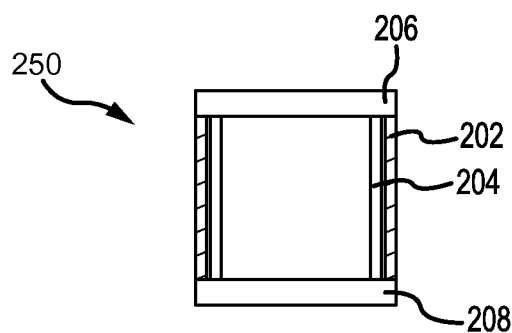

PMA 122 may comprise any array of magnets having at least two different types of magnets. With reference to FIGS. 2A, 2B and 2C, PMA 122 may comprise PMA 200 or PMA 250. PMA 200 may exist in two states: the "on" state and the "off" state. The "on" state may be a state where a magnetic flux is exerted externally to PMA 200, for example, as illustrated by magnetic flux lines 114, with momentary reference to FIG. 1. The "off" state may be a state where no magnetic flux and/or substantially no magnetic flux is exerted externally to PMA 200.

PMA 200 comprises two different types of magnets, Type A magnets and Type B magnets. Type A magnets (as the phrase is used herein) are permanent magnets comprised of a material with high remanence induction $B_R$ and high coercivity $H_C$. For example, a Type A magnet may comprise a rare-earth Neodymium-Iron-Boron (NdFeB) type. Type B magnets, as the term is used herein, are permanent magnets comprised of a material with high remanence induction (for example, having a high remanence induction as high as that of Type A magnets), but with substantially lower coercivity than Type A magnets. For example, a Type B magnet may comprise an Aluminum-Nickel-Cobalt type such as an ALNICO 5 magnet. With momentary reference to FIG. 1, both Type A magnets and Type B magnets of PMA 122 may be anisotropically aligned (along the longitudinal axis of the individual magnets). PMA 122 may comprise Type A magnets and Type B magnets anisotropically aligned in parallel with axis A-A'. Type A magnets and Type B magnets are typically cast into a solid, cylindrical shape, as shown in FIGS. 2A, 2B and 2C, but other shapes such as rectangles, wedges, etc. are also within the scope of the present disclosure. With reference back to FIG. 2A and 2B, PMA 200 is illustrated as having alternating Type A magnet 202 and Type B magnet 204 arranged in an annular, cylindrical configuration. Top retention ring and flux guide 206 and bottom retention ring and flux guide 208 are arranged as shown to retain the Type A magnets and Type B magnets in a cylindrical configuration. Top retention ring and flux guide 206 and bottom retention ring and flux guide 208 may comprise magnetically "soft" steel poles. Magnetically "soft" may refer to a steel with relatively low carbon content.

In PMA 250, top retention ring and flux guide 206 and bottom retention ring and flux guide 208 may be arranged as shown to retain the Type A magnets and Type B magnets in the FIG. 2C exemplary embodiment of a cylindrical configuration. However, in PMA 250, the Type A magnets and Type B magnets are configured to be concentric cylinders. As show, Type A magnets 202 are disposed in a cylindrical shape circumferentially around (and, in various embodiments, coaxial or substantially coaxial to) Type B magnets 204. In various embodiments, Type B magnets 204 are disposed in a cylindrical shape circumferentially around (and, in various embodiments, coaxial or substantially coaxial to) Type A magnets 202.

Figure 3:
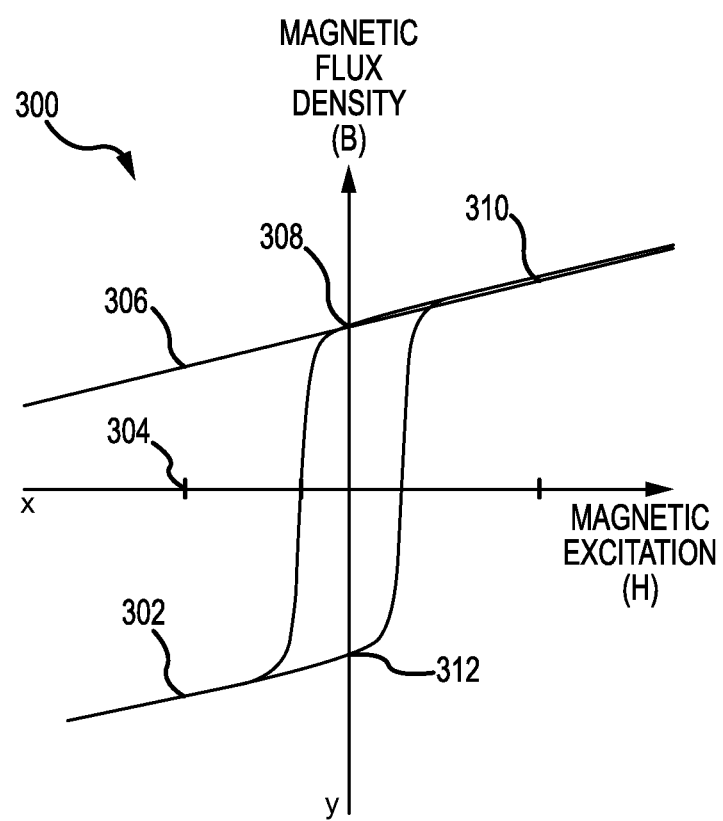
FIG. 3 illustrates a graph of magnetic excitation (on the x axis) and magnetic flux density (on the y axis) of Type A magnets, as defined herein, and Type B magnets, as defined herein, in accordance with various embodiments.

With reference to FIG. 3, the magnetic excitation of the Type B magnets in PMA 122 may be changed by application of an externally applied current, such as a current pulse. FIG. 3 illustrates a graph of magnetic excitation (on the x axis) and magnetic flux density (on the y axis) of Type A magnets and Type B magnets, as defined herein, in accordance with various embodiments.

In various embodiments, a negative coil current pulse is applied such that both Type A magnets and Type B magnets are subjected to a strong negative H-field at point 304. Since the Type B magnet (e.g., an ALNICO magnet) has a low magnetic coercivity $H_C$, this negative current pulse reverses the magnetization direction in the Type B magnets and drives the Type B magnets to point 302. While the applied current pulse is decreasing to zero, the Type B magnets 'recoils' according to its magnetic material characteristic from point 302 until it settles at point 312, where it retains its "flipped" negative flux density. Stated another way, subjecting Type B magnets to a negative current pulse is able to reverse (i.e., "flip") magnetic flux density. At the same time, the Type A magnet, which possesses a much higher magnetic coercivity than the Type B magnet, responds to the same negative current pulse with a mere excursion along its fully reversible demagnetization curve to point 306 and back to point 308 where it retains its original positive flux density in a stable state. In that regard, in the "off" state, PMA 122 may have Type A magnets at point 308 and Type B magnets at point 312. The effect of the reversed magnetic flux density may be illustrated in FIG. 4B.

Figure 4A:
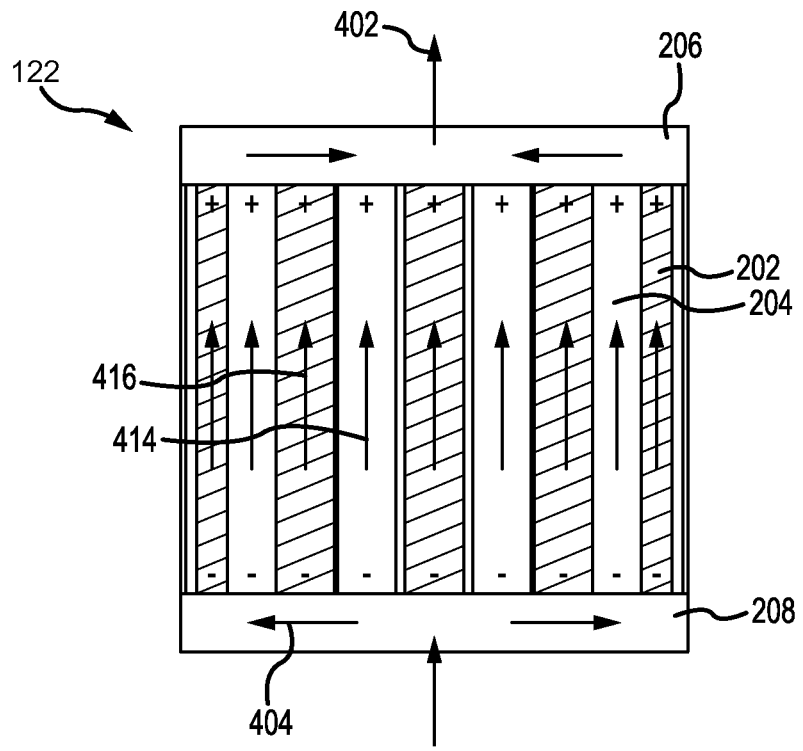
FIGS. 4A and 4B illustrates a permanent magnet array of the PBA of FIG. 1 in an "on" state and an "off" state, as defined herein, in accordance with various embodiments.
Figure 4B:
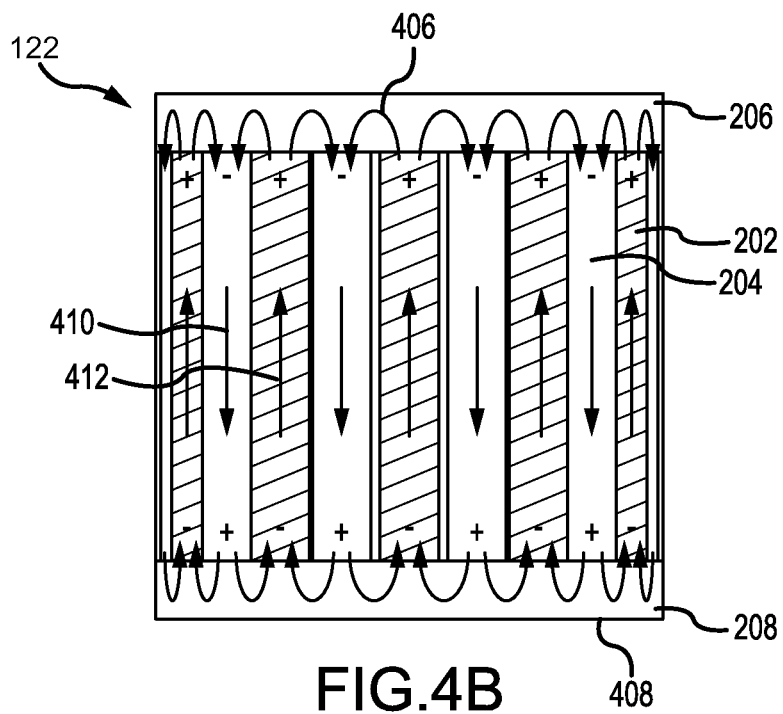

With reference to FIG. 4B, Type A magnets 202 and Type B magnets 204 are illustrated. Type A magnets 202 have a magnetic flux 412 in the direction of top retention ring 206. Type B magnets 204 have a magnetic flux 410 in the direction of bottom retention ring and flux guide 208. Type A magnets 202 have an equal and opposite magnetic flux than Type B magnets 204, as shown in FIG. 3, so magnetic flux 412 and magnetic flux 410 are of equal and/or near equal magnitude but of opposite direction. In that regard, the magnetic flux of the Type A magnets 202 and Type B magnets 204 cancel one another (e.g., produce a "short-circuit" flux with one another) as shown by magnetic flux 406. PMA 122 is in an "off" state because there is no external magnetic flux generated due to the short-circuit effect.

With reference back to FIG. 3, a positive high current pulse may be applied, which now returns the Type B magnets 204 back to its original magnetic flux density at point 308. The Type A magnets 202 follow their own magnetization curve from point 308 to point 310 and back to point 308. In that regard, both Type A magnets 202 and Type B magnets 204 have magnetic flux vectors aligned in the same direction, thereby producing magnetic flux that extends externally from PMA 200.

With reference to FIG. 4A, Type A magnets 202 and Type B magnets 204 are illustrated. Type A magnets 202 have a magnetic flux 416 in the direction of top retention ring 206. Type B magnets 204 have a magnetic flux 414 in the direction of top retention ring 206. Type A magnets 202 have an equal magnetic flux than Type B magnets 204, as shown in FIG. 3. Magnetic flux 416 and magnetic flux 414 are of equal and/or near equal magnitude and in the same direction. In that regard, external magnetic flux 402 is illustrated emanating from PMA 122. PMA 122 is in an "on" state because there is now an external magnetic flux generated.

With reference back to FIG. 1, as discussed, PMA 122 may comprise PMA 200 or PMA 250. In the "on" state, PMA 122 may exert a magnetic flux through the control ring 124 into shaft collar 126, creating a magnetic attraction force and mechanical friction torque between control ring 124 and shaft collar 126. The control ring 124 may rotate with respect to shaft 110 and, because wrap spring 116 is fixed to control ring 124, wrap spring 116 may begin to coil more tightly. This exerts a compressive force on friction hub 108 and, by extension, shaft 110. The compressive force restrains shaft 110 from rotational motion. Shaft 110 is thus constrained from rotational motion in response to the PMA 122 being in the "on" state. In such a state, PBA 100 may be in a "locked" state.

A negative current pulse may be conducted through leads 102 into coil 106. The negative current pulse may change the magnetic field flux direction in the Type B magnets of PMA 122, thus turning PMA 122 to the "off" state. In that regard, in the "off" state, PMA 122 may not exert a magnetic flux density and mechanical friction torque through the control ring 124. The control ring 124 may rotate in the opposite direction with respect to shaft 110 as control ring 124 did in response to PMA 122 being in the "on" state. Because wrap spring 116 is fixed to control ring 124, wrap spring 116 may begin to coil less tightly. This removes and/or reduces the compressive force on friction hub 108 and, by extension, shaft 110. Shaft 110 is thus free to rotate in response to the PMA 122 being in the "off" state. In such a state, PBA 100 may be in an "unlocked" state.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A park brake actuator ("PBA") comprising:
   a shaft having a friction hub disposed about the shaft, the friction hub fixed against rotation with respect to the shaft;
   a permanent magnet array ("PMA") disposed circumferentially about the shaft,
   the PMA comprising a cylindrical structure comprising a Type A magnet adjacent to a Type B magnet in an annular arrangement, wherein the Type A magnet comprises a first coercivity and the Type B magnet comprises a second coercivity, wherein the first coercivity is higher than the second coercivity; and
   a coil disposed circumferentially about the PMA and configured to conduct at least one of a positive current pulse and a negative current pulse.

2. The PBA of claim 1, further comprising a wrap spring disposed circumferentially about the friction hub.

3. The PBA of claim 2, further comprising a control ring disposed circumferentially about the shaft.

4. The PBA of claim 3, wherein the control ring is fixed to a portion of the wrap spring.

5. The PBA of claim 4, wherein the control ring is configured to rotate about the shaft in a first direction in response to the PMA exerting a magnetic flux on the control ring, and wherein a proximate end of the wrap spring is rotated about the shaft by the control ring, wherein a distal end of the wrap spring is fixed to a top plate.

6. The PBA of claim 5, wherein the rotation of the wrap spring causes the wrap spring to coil more tightly, wherein the wrap spring exerts a compressive force on the friction hub.

7. The PBA of claim 5, further comprising a flux guide proximate the PMA.

8. The PBA of claim 5, wherein the control ring is configured to rotate about the shaft in a second direction in response to the PMA ceasing to exert the magnetic flux on the control ring.

9. A park brake actuator ("PBA") comprising:
   a shaft having a friction hub disposed about the shaft, the friction hub fixed against rotation with respect to the shaft;
   a permanent magnet array (PMA) disposed circumferentially about the shaft,
   the PMA comprising a cylindrical structure comprising an annular arrangement of Type A magnets disposed concentrically with an annular arrangement of Type B magnets; and
   a coil disposed circumferentially about the PMA and configured to conduct at least one of a positive current pulse and a negative current pulse.

10. The PBA of claim 9, further comprising a wrap spring disposed circumferentially about the friction hub.

11. The PBA of claim 10, further comprising a control ring disposed circumferentially about the shaft.

12. The PBA of claim 11, wherein the control ring is fixed to a portion of the wrap spring.

13. The PBA of claim 12, wherein the control ring is configured to rotate about the shaft in a first direction in response to the PMA exerting a magnetic flux on the control ring, and wherein a proximate end of the wrap spring is rotated about the shaft by the control ring, wherein a distal end of the wrap spring is fixed to a top plate.

14. The PBA of claim 13, wherein the rotation of the wrap spring causes the wrap spring to coil more tightly, wherein the wrap spring exerts a compressive force on the friction hub.

15. The PBA of claim 14, wherein the control ring is configured to rotate about the shaft in a second direction in response to the PMA ceasing to exert the magnetic flux on the control ring.

* * * * *